United States Patent [19]
Haggard

[11] Patent Number: 6,082,667
[45] Date of Patent: Jul. 4, 2000

[54] INFLATED WING

[76] Inventor: Roy A. Haggard, 29335 Jarrell Ct., Nuevo, Calif. 92567

[21] Appl. No.: 09/041,161

[22] Filed: Mar. 12, 1998

Related U.S. Application Data

[63] Continuation-in-part of application No. 08/426,400, Apr. 21, 1995, abandoned.

[51] Int. Cl.[7] ....................................................... B64C 3/30
[52] U.S. Cl. ......................................... 244/35 R; 244/123
[58] Field of Search ........................... 244/5, 123, 117 R, 244/146

[56] References Cited

U.S. PATENT DOCUMENTS

| | | |
|---|---|---|
| 3,106,373 | 10/1963 | Bain et al. . |
| 3,282,533 | 11/1966 | Spain . |
| 3,559,920 | 2/1971 | Moore . |
| 3,921,944 | 11/1975 | Morrison . |
| 3,957,232 | 5/1976 | Sebrell . |
| 4,671,471 | 6/1987 | Patmont . |
| 4,725,021 | 2/1988 | Priddy . |
| 4,858,854 | 8/1989 | Jacobson . |
| 5,112,663 | 5/1992 | Morenz et al. . |
| 5,244,169 | 9/1993 | Brown et al. . |
| 5,299,827 | 4/1994 | Igawa . |

FOREIGN PATENT DOCUMENTS

| 2664232 | 1/1992 | France | .................................... 244/146 |

*Primary Examiner*—Peter M. Poon
*Assistant Examiner*—Tien Dinh
*Attorney, Agent, or Firm*—Frank C. Price

[57] ABSTRACT

An inflatable wing containing high pressure inflated spars incorporates open cell foam filling the space within the wing. The foam inflates to a shape in tension which defines the surface contour of the wing. An inflated tube, similar to the spars, is used as a torque tube to actuate the control surface of the wing.

2 Claims, 2 Drawing Sheets

INFLATED WING

CONTINUATION-IN-PART

This is a Continuation-In-Part application for application Ser. No. 08/426,400 which was filed Apr. 21, 1995, now abandoned.

BRIEF DESCRIPTION

This is the invention of a wing which derives its strength from inflation by impact air pressure and/or by an inflation gas from a compressed or generated source. The design allows the wing to be stored compactly in the uninflated form and provides a low-weight structure. The main strength of the wing is provided by inflated, tubular spars inside the wing. Inflation pressure gives the spars the required strength. This inflation can be by compressed gas or by a gas delivered from a pyrotechnic device.

The wing shape itself, surrounding the spars, can be inflated by ram air as the wing flies or by a gas source regulated at a pressure substantially less than that for inflating the spars. The inflated wing shape is filled entirely by plastic foam surrounding the spars and supporting the shape of the skin of the wing. The inflated foam shape is attached to the wing surfaces. This is an open cell foam which is permeated by inflation gas pressure. This allows transport of ram air or other inflation gas throughout the foam. The foam is inflated to the point of being in tension, the tension limiting the inflation to the desired shape of the wing. The foam, filling in all major spaces and interstices within wing volume and shaped to match the contour of the wing surface, fills out under pressure and defines a smooth contour to support the surface skin of the wing. Thus, any wrinkles in the sheet material making up the skin of the wing are forced out to smoothness by the foam as it extends to its limit under the skin.

More can be said about how the foam fills the volume of the wing which is internal to the outer surfaces, the internal volume being enclosed by the skin of the wing. The internal wing space is complicated in shape by the presence of the spars, pressurizing tubes and other components, and minor corners and pockets on the interior side of the wing skin or surface. Anywhere that support of the wing surface requires it, foam fills the space.

There are three types of pressure spars within the wing. One set is made up of strength-giving spars to give the wing its ability to resist external lift and drag forces. Another single spar helps, along with the foam surrounding it, to fill in the leading edge contour of the wing. The third type of spar functions as a torque tube extending along the interior of the wing towards the rear of the wing, installed in a way to allow free rotation of the spar within the wing. The end portion of the torque tube carries and rotates an aileron control surface which adjusts the wing lift, i.e., controlling the path of the craft supported by the wing.

An inflatable wing is taught by McDaniel, U.S. Pat. No. 1,905,298. McDaniel includes multiple tubular spars and a flexible skin. However, his teaching does not include adequate means to support the skin in a smooth, accurate airfoil contour. The improvements of this invention include (1) the use of open cell foam with its ability to inflate to a smooth, specific contour under pressure and (2) the foam used in combination with high pressure tubular spars. The optimal use of a pressurized tube as a control-surface-actuating torque tube is also an improvement.

DESCRIPTION OF THE PREFERRED EMBODIMENT

Figure 1:
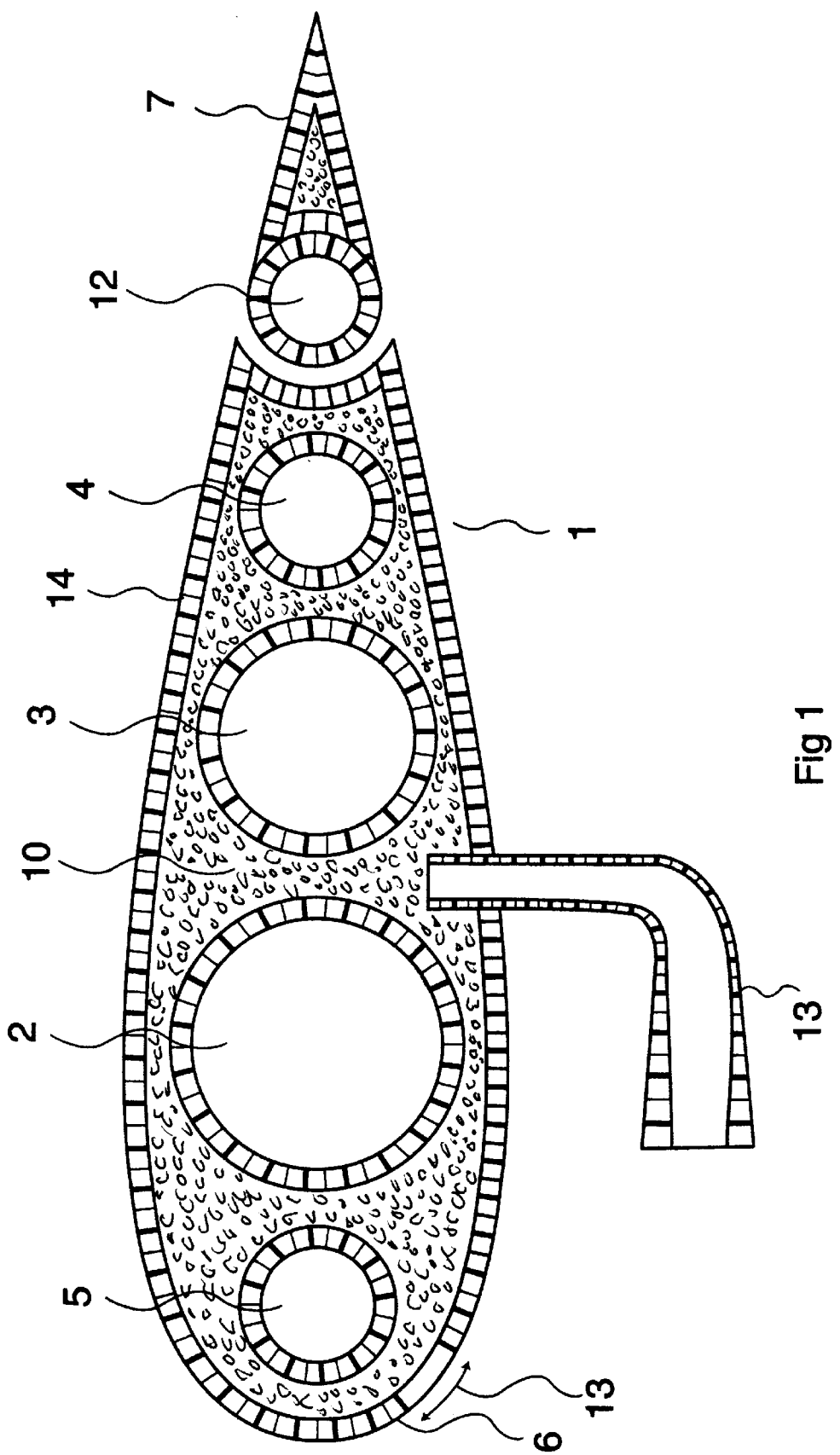
FIG. 1 is a cross section of the inflated wing.
Figure 2:
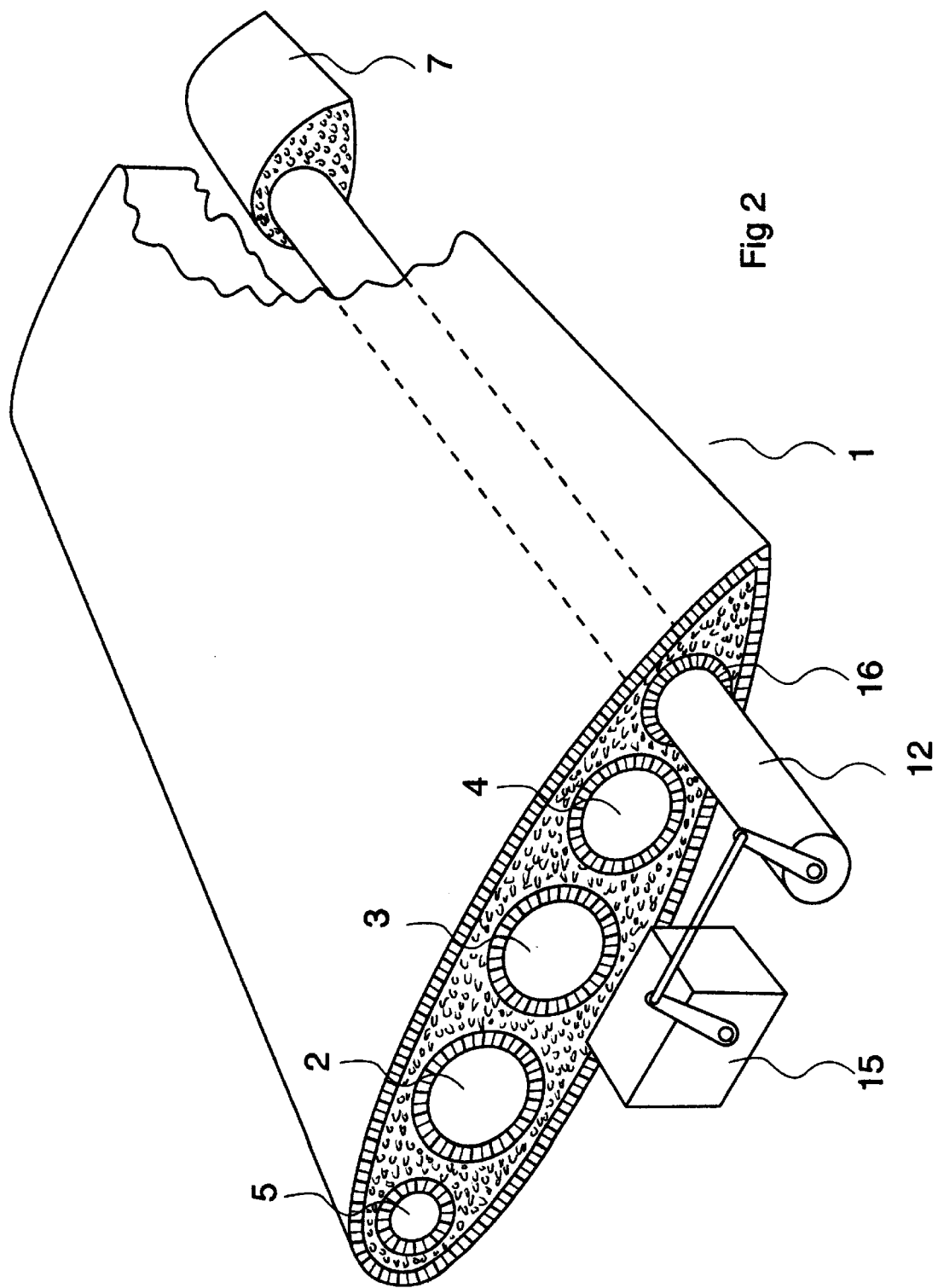
FIG. 2 is a cut-away isometric view of the wing to illustrating the aileron torque tube.

In FIG. 1 can be seen the wing 1 in cross section with its three inflated spar beams 2, 3, and 4. The surface of the wing 14 is made of foldable sheet material. This is an example; other useful for in-flight deployment of munitions or unmanned vehicles.

Although inflation pressure is chosen in each case according to the dimensions of the wing, the weight of the vehicle and the maneuver load factor, typical inflation pressure is 50 psi or greater, while ram air pressure at 100 mph is 0.17 psi. Thus it is seen that there is a large pressure difference between the high pressure used to stiffen the spars and the low pressure used to shape the airfoil contour through the open cell foam.

Typical materials are: coated fabric for the skin, polyurethane for the foam, and Aramid yarn braided over polyurethane film for the spars. An alternate embodiment for use at high airspeed includes the use of a rigid material at the leading edge, which facilitates deployment into a high velocity airstream and also allows the use of an airfoil contour with a small leading edge radius.

While this specification refers to a wing, included embodiments are understood to include other aerodynamic devices such as stabilizers, tail surfaces, control surfaces, fairings and the like. While the specification shows a cantilevered wing, it is considered obvious that wire- or strut-braced wings, or wings connected to payloads using suspension lines can also be made using these descriptions.

I claim:

1. A wing, foldable for storage, said wing having an outer skin and having an internal volume, one or more tubular spars, said spars being composed of flexible material, said spars becoming stiff upon filling with gas under pressure; comprising:

said outer skin defining an airfoil shape; an open cell, flexible foam attached to said skin, said foam filling said internal volume between said spars and said skin, said foam expanding under inflating gas pressure to define said airfoil shape of said skin and resisting expansion under pressure beyond said shape by internal tension within said foam.

2. The wing of claim 1 including a wing control surface, and an inflatable spar installed within said wing, comprising:

said inflatable spar rotatable freely within said wing; torque means for rotating said spar; said spar attached to said control surface, actuation of said control surface via torque transmitted via said inflatable spar, said inflatable spar being collapsible as part of said foldable wing and control surface.

* * * * *